US010209763B2

(12) United States Patent
Akella et al.

(10) Patent No.: US 10,209,763 B2
(45) Date of Patent: Feb. 19, 2019

(54) POWER AWARE SWITCHING USING ANALYTICS

(71) Applicant: CISCO TECHNOLOGY, INC., San Jose, CA (US)

(72) Inventors: Anand V. Akella, San Jose, CA (US); Praveen Parthasarathy Iyengar, San Jose, CA (US); Rajendra Kumar Thirumurthi, Milpitas, CA (US); Samar Sharma, San Jose, CA (US); Krishna Bharadwaj Dharwada, Santa Clara, CA (US); Vivek Purushotham, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 15/261,605

(22) Filed: Sep. 9, 2016

(65) Prior Publication Data

US 2018/0074570 A1 Mar. 15, 2018

(51) Int. Cl.
*H04L 12/721* (2013.01)
*G06F 1/32* (2006.01)
*G06N 99/00* (2010.01)
*H04L 12/26* (2006.01)
(Continued)

(52) U.S. Cl.
CPC .......... *G06F 1/3287* (2013.01); *G06F 1/3215* (2013.01); *G06F 1/3278* (2013.01); *G06N 99/005* (2013.01); *H04L 41/0833* (2013.01); *H04L 43/08* (2013.01); *H04L 43/0876* (2013.01); *H04L 45/08* (2013.01); *H04L 45/123* (2013.01); *H04L 45/70* (2013.01);
(Continued)

(58) Field of Classification Search
CPC .................................................... G06F 1/3287
See application file for complete search history.

(56) References Cited

U.S. PATENT DOCUMENTS 9,059,924 B2 * 6/2015 Imai .................... H04L 41/145
2010/0274943 A1 10/2010 Mahadevan et al.
2010/0284287 A1 11/2010 Venuto
(Continued)

OTHER PUBLICATIONS

International Search Report and Written Opinion in corresponding International Application No. PCT/US2017/050019, dated Dec. 7, 2017, 14 pages.

*Primary Examiner* — Kim Huynh
*Assistant Examiner* — Eric Chang

(57) ABSTRACT

A method is described and in one embodiment includes, for each of a plurality of outgoing ports of a first network element: collecting data comprising a number of packets arriving the outgoing port and an amount of power consumed by the outgoing port for a first time interval; calculating a packet per watt ("P/W") metric for the port for the first time interval, wherein the P/W metric comprises the number of packets coming into the port divided by the amount of power consumed by the port during the first time interval; repeating the collecting and calculating for a number of successive time intervals; calculating a mean P/W metric for a time period comprising the first time interval and the successive time intervals; and calculating a variance for the time period comprising the first time interval and the successive time intervals. The method further includes redirecting traffic received at the network element to the outgoing port having the lowest variance.

20 Claims, 6 Drawing Sheets

(51) Int. Cl.
*H04L 12/751* (2013.01)
*H04L 12/24* (2006.01)
(52) U.S. Cl.
CPC ............ *H04L 41/147* (2013.01); *H04L 41/16* (2013.01); *H04L 45/12* (2013.01)

(56) References Cited

U.S. PATENT DOCUMENTS

| | | |
|---|---|---|
| 2010/0329276 A1 | 12/2010 | Wang et al. |
| 2012/0120958 A1 | 5/2012 | Mahadevan et al. |
| 2012/0228936 A1 | 9/2012 | Kabbara et al. |
| 2015/0169033 A1 | 6/2015 | Shukla et al. |
| 2015/0282074 A1* | 10/2015 | Szabo ................ H04L 47/127 370/311 |
| 2016/0091913 A1 | 3/2016 | Pani |

* cited by examiner

| SCENARIO 1 | | | | | | | |
|---|---|---|---|---|---|---|---|
| INCOMING INTERFACE | INCOMING PACKET | SNAPSHOT INTERVAL | WATT | P/W | MEAN | VARIANCE SUM(x-MEAN)^2/N-1 | STANDARD DEVIATION SQRT(VARIANCE) |
| ETH1/1 | 100000.00 | 0 SEC | 600.00 | 166.67 | 171.98 | 509.09 | 22.56 |
| | 120000.00 | 5 SEC | 610.00 | 196.72 | | | |
| | 90000.00 | 10 SEC | 590.00 | 152.54 | | | |
| SCENARIO 2 | | | | | | | |
| INCOMING INTERFACE | INCOMING PACKET | SNAPSHOT INTERVAL | WATT | P/W | MEAN | VARIANCE SUM(x-MEAN)^2/N-1 | STANDARD DEVIATION SQRT(VARIANCE) |
| ETH2/1 | 50000.00 | 0 SEC | 450.00 | 111.11 | 102.76 | 68.23 | 8.26 |
| | 40000.00 | 5 SEC | 390.00 | 102.56 | | | |
| | 35000.00 | 10 SEC | 370.00 | 94.59 | | | |
| SCENARIO 3 | | | | | | | |
| INCOMING INTERFACE | INCOMING PACKET | SNAPSHOT INTERVAL | WATT | P/W | MEAN | VARIANCE SUM(x-MEAN)^2/N-1 | STANDARD DEVIATION SQRT(VARIANCE) |
| ETH3/1 | 10000.00 | 0 SEC | 350.00 | 28.57 | 29.16 | 9.14 | 3.02 |
| | 12000.00 | 5 SEC | 370.00 | 32.43 | | | |
| | 9000.00 | 10 SEC | 340.00 | 26.47 | | | |

FIG. 3

POWER AWARE SWITCHING USING ANALYTICS

TECHNICAL FIELD

This disclosure relates in general to the field of communications networks and, more particularly, to techniques for power aware switching using analytics in such networks.

BACKGROUND

A primary component of the operational cost of a data center is energy consumption of devices that make up the data center network. As the number of devices in a data center network increases, the overall energy consumption (and cost thereof) also increases. Over the course of a decade, the amount of energy consumed by an average data center has increased tremendously. Data center switches consume a considerable amount of power even when they are not actively being used. It would be useful to reduce the overall amount of power consumption of a data center network in a manner that does not negatively impact the performance of the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a table illustrating example statistical data that may be collected and calculated by the power saving module for each outgoing port of a network element of a network in accordance with embodiments described herein for implementing power aware switching using data analytics;

DETAILED DESCRIPTION OF EXAMPLE EMBODIMENTS

Overview

Figure 1:
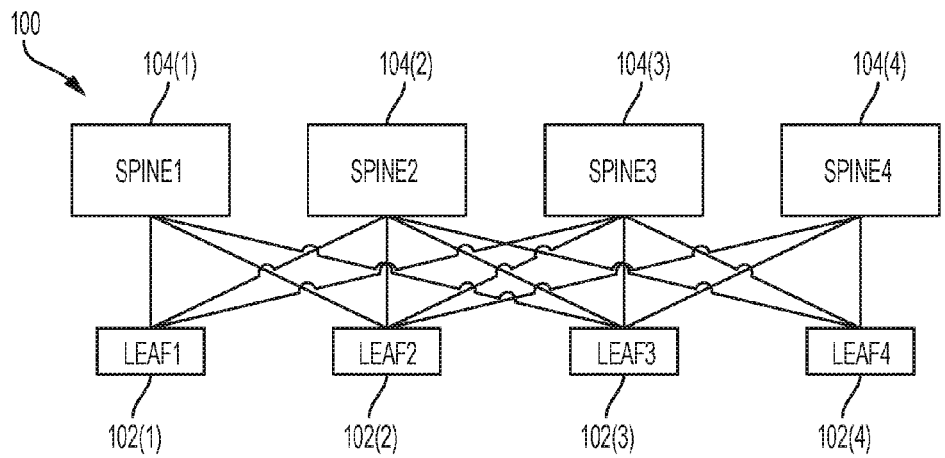
FIG. 1 is a simplified block diagram of communications network in which embodiments described herein for power aware switching using data analytics may be implemented.

A method is described and in one embodiment includes, for each of a plurality of outgoing ports of a first network element: collecting data comprising a number of packets arriving the outgoing port and an amount of power consumed by the outgoing port for a first time interval; calculating a packet per watt ("P/W") metric for the port for the first time interval, wherein the P/W metric comprises the number of packets coming into the port divided by the amount of power consumed by the port during the first time interval; repeating the collecting and calculating for a number of successive time intervals; calculating a mean P/W metric for a time period comprising the first time interval and the successive time intervals; and calculating a variance for the time period comprising the first time interval and the successive time intervals. The method further includes redirecting traffic received at the network element to the outgoing port having the lowest variance.

Example Embodiments

Analytics may be defined as the discovery, interpretation, and communication of meaningful patterns in data. Analytics is especially useful in areas rich in recorded information and relies on the simultaneous application of statistics, computer programming, and operations research to quantify performance. Analytics may be applied to business and other types of data to describe, predict, and improve upon performance. One area in which analytics software is particularly useful is in addressing the challenges of analyzing massive and often complex data sets (commonly referred to as "big data").

Data generated by different domains, such as financial, health care, and Internet of Things ("IoT"), and user-generated data has led to a new domain, which as noted above is commonly referred to as big data. The term big data is used to refer to data sets that are so large or complex that traditional data processing methods are insufficient to adequately analyze them. Challenges in dealing with big data arise in the areas of data capture and curation, analysis, searching and querying, sharing, storage, transfer, visualization, updating, and privacy, and is often due to the fact that data is typically unstructured. The term big data may be used in certain context to refer to the use of predictive, user behavior, or other advanced data analytics methods for extracting value from the data rather than to the size of a particular data set.

Data sets are growing rapidly due in part to the fact that data is being increasingly gathered by inexpensive and ubiquitous data sensing devices. Using various statistical models, machine learning algorithms can predict and automatically make decisions based on big data. Data growth challenges and opportunities have been defined as being three-dimensional; that is, the volume of data, the velocity of data, and the variety of data. This "3Vs" model is often used to describe big data.

In accordance with features of embodiments described herein below, statistical data related to the number of packets and the power consumed by components (such as line cards and ASICs, for example) of network switching elements are collected and a "packet per watt" or "P/W" metric is calculated on a per-port basis for each outgoing port (and corresponding link). Based on patterns of the statistical data collected over a predetermined time period, a predictive model may be used to determine whether and what actions should be taken with regard to switching outgoing traffic on the switching element based on a power consumption metric for each port and for all of the ports collectively. Actions that may be taken in response to the analysis include (in order of increasing severity) displaying per-port power savings for the switching element, powering down a port and moving traffic to another port (or other ports) of the switching element, powering down parts of an ASIC (e.g., a Tertiary Content-Addressable Memory ("TCAM")) of the switching element, powering down an ASIC of the switching element in its entirety, powering down a line card of the switching element, and/or powering down the switching element in its entirety.

A power saving module for implementing switching based on lowest power consumed may be implemented on a supervisor module or on each line card of a chassis of a switching element, or switch. In accordance with features of embodiments described herein, the power saving module collects per-port statistics including the number of packets being switched out of outgoing port as well as the amount of power consumed, e.g., by the switch and/or the line card associated with the port. Once this data is collected for a periodic time interval, the number of packets per watt (or P/W) is calculated for each output port of the switch and may be used in determining a cost of transporting data on a link associated with the port. As will be described in greater detail below, the statistical data collected by the power saving module may also be forwarded to a database, such as a Hadoop engine, for further processing by a machine learning service, which may process the received new statistical data and compare it with historical data stored in the database.

Referring now to FIG. 1, illustrated therein is a simplified block diagram of communications network 100 in which embodiments described herein for power aware switching using data analytics may be implemented. As illustrated in FIG. 1, the network 100 is implemented using a full mesh topology including a plurality of leaf nodes, represented in FIG. 1 by leaf nodes 102(1)-102(4), and a plurality of spine nodes, represented in FIG. 1 by spine nodes 104(1)-104(4). For purposes of example, it will be assumed that spine nodes 104(1)-104(3) are involved in actively forwarding data traffic in the network 100. In contrast, spine node 104(4) may exist in the network 100 solely for purposes of high availability and may be used to forward very little, if any, network traffic.

Link-state protocols such as Open Shortest Path First ("OSPF") and Intermediate System to Intermediate System ("ISIS") use a shortest path first algorithm to compute the shortest path between a packet's source and intended destination. The link-state protocol algorithm calculates the shortest path to each destination based on the cumulative cost of reaching the destination. This "cost" includes a metric for each interface, or port, and the overhead for sending packets across the interface. In accordance with features of embodiments described herein, a new metric (i.e., packet/watt) is proposed and may be utilized in determining path cost in calculating the shortest path between source and destination nodes in a network.

In accordance with features of embodiments described herein, the shortest path first algorithm will choose a path has the lowest metric to reach a specific destination from the particular source. The traffic pattern keeps changing over the period of time. With the help of statistics, the link having the lowest variance in a power (or packet/watt) metric may be used for forwarding network traffic from a source node to a destination node in the network.

In accordance with features of embodiments described herein, a packet/watt metric, or power metric, is calculated for each output port of each of the leaf nodes 102(1)-102(4). In certain embodiments, the number of packets at each output port can be measured by periodically polling the port at a default or user-selected time interval. In certain embodiments, the amount of power consumed may be measured using a show power output and the same information can be used at a per-module or per-line card level. It will be recognized, however, that numerous other methods for measuring power consumed may be used without departing from the spirit of the scope of embodiments described herein.

Figure 2:
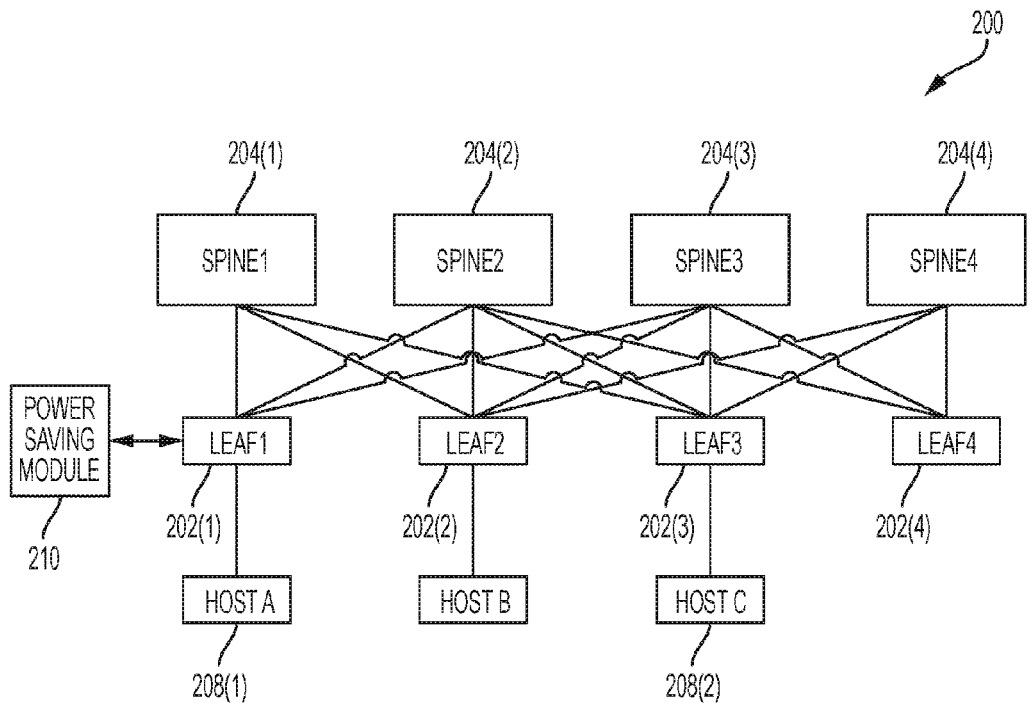
FIG. 2 is another simplified block diagram of communications network in which embodiments described herein for power aware switching using data analytics may be implemented.

Referring to FIG. 2, illustrated therein is a more detailed block diagram of a communications network 200 in which embodiments described herein for power aware switching using data analytics may be implemented. As illustrated in FIG. 2, similar to the network 100, the network 200 is implemented using a full mesh topology including a plurality of leaf nodes, represented in FIG. 2 by leaf nodes 202(1)-202(4), and a plurality of spine nodes, represented in FIG. 2 by spine nodes 204(1)-204(4). For purposes of example, it will be assumed that spine nodes 204(1)-204(3) are actively forwarding data traffic in the network 200. In contrast, spine node 204(4) may exist in the network 200 solely for purposes of high availability and forwards very little, if any, network traffic. Referring to FIG. 2, it will be assumed for the sake of example that a host 208(1) on leaf 202(1) wants to communicate with a host 208(2) on leaf 202(3). There are three paths to reach host 208(2) from host 208(1), including a first path via spine 204(1) ("Eth 1/1"), a second path via spine 204(2) ("Eth 2/1"), and a third path via spine 204(3) ("Eth 3/1"). In the illustrated example, a hashing algorithm implemented by an Equal Cost Multi-Path ("ECMP") routing function may always chose the first path via spine 202(1) (Eth 1/1) such that the port is heavily congested with other traffic. In accordance with certain embodiments described herein, a power saving module 210 associated with the leaf node 202(2) collects statistical data for all of the outgoing ports (Eth1/1, 2/1 and 3/1) and uses that data to determine a power metric for each of the ports, as will be described in detail below. To increase accuracy, the statistical data for each port may be at snapshot intervals x, the length of which may be adjusted as desired or necessary. It will be assumed for the sake of example herein that x is equal to 5 seconds.

Referring now to FIG. 3, illustrated therein is a table illustrating example statistical data that may be collected and calculated by the power saving module (e.g., power saving module 210) for each outgoing port of leaf node 202(1) of the network 200 in accordance with embodiments described herein for implementing power aware switching using data analytics. As shown in FIG. 3, at each snapshot interval x, an amount of power associated with and a number of packets received at each of the outgoing ports Eth1/1, Eth2/1, and Eth3/1 is collected by the power saving module 210.

In certain embodiments, a "show power" or "show environment status" command causes to be displayed the amount of power consumed by each line card and the supervisor module. The "Watt" column of the table shown in FIG. 3 indicates the amount of power consumed by a line card, which is used to calculate mean, standard deviation, and variance of packet/watt metrics for each, as will be described herein. In certain embodiments, such as those used as an example herein, power consumption of a line card is indicative of power consumption of an outgoing port, as each port resides on a different line card. It will be recognized that in certain embodiments, power consumed by a port may be determined in some other manner.

Using port Eth1/1 as an example, during a first snapshot interval (0 seconds), the number of incoming packets for the port is 100K and the number of watts consumed is 600; during a second snapshot interval (5 seconds), the number of incoming packets for the port is 120K and the number of watts consumed is 610; during a third snapshot interval (10 seconds), the number of incoming packets is 90K and the number of watts consumed is 590. The collected data is used to calculate a packet per watt ("P/W") metric for each of the snapshot intervals. Using the same port Eth1/1 for purposes of example, the P/W metric is 166.67 for the first snapshot interval (0 seconds), 196.72 for the second snapshot interval (5 seconds), and 152.54 for the third snapshot interval (10 seconds). A mean of the P/W metrics is then calculated for each port and is used to determine a variance and a standard deviation for of the P/W metrics for each port. Referring to FIG. 3 and once again using port Eth1/1 as an example, the mean for the three snapshot intervals is 171.98 packets per watt. As previously noted, once the mean has been calculated, the variance (509.09) and the standard deviation (22.56) may also be calculated for the port. In accordance with features of embodiments described herein, the variance may be used as the cost metric for the port, or corresponding link, which may be used by a shortest path algorithm for switching purposes. In the example illustrated in FIG. 3, the variance of the port Eth3/1 (9.14) is (significantly) lower than the variance of the port Eth1/1 (509.09) and that of the port Eth2/1 (68.23); therefore, in accordance with embodiments described herein, the port Eth3/1 would be deemed to have the lowest cost for purposes of computing a shortest path between host 208(1) and host 208(2).

Figure 4:
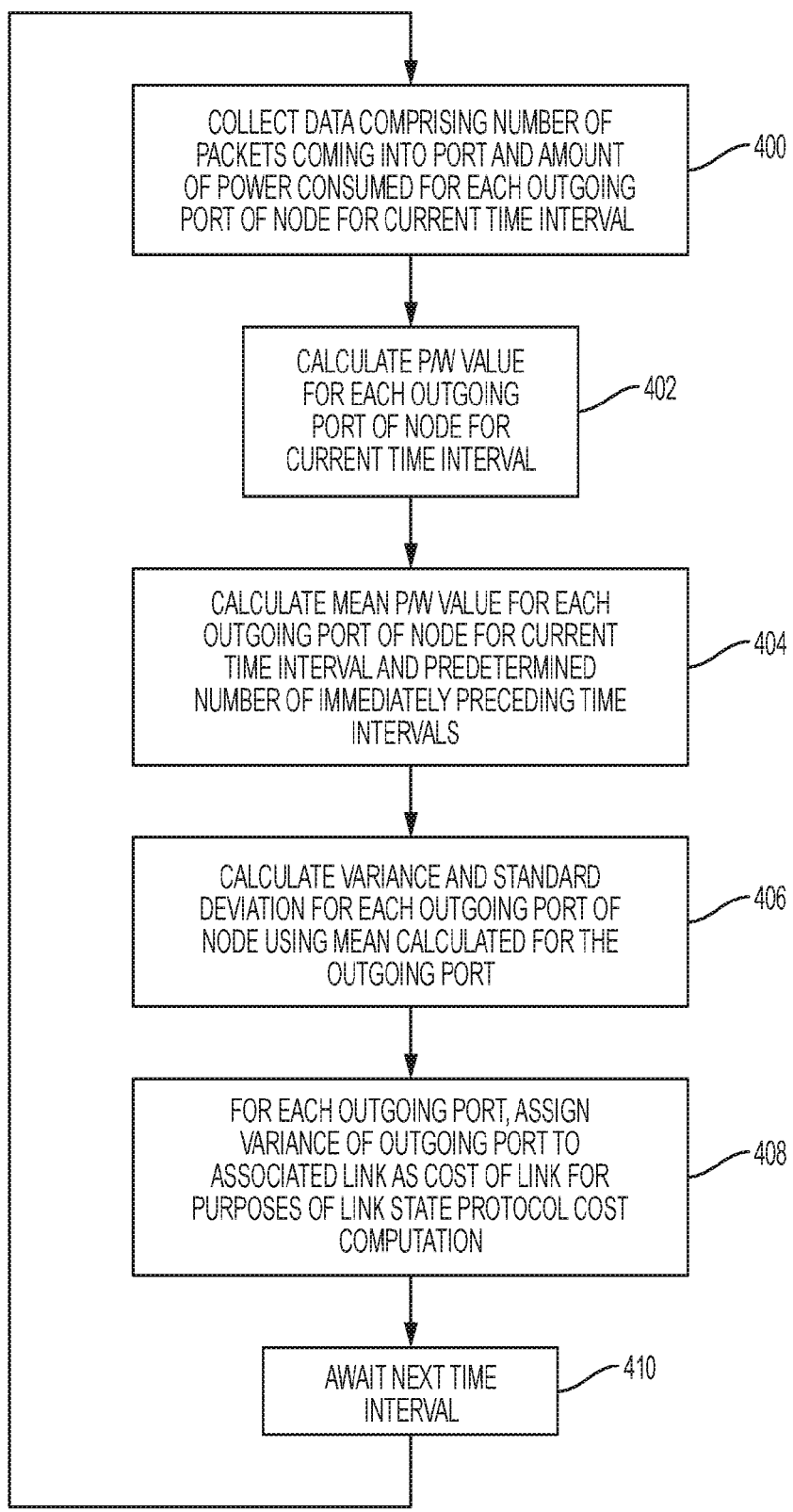
FIG. 4 is a flow diagram illustrating steps that may be performed in implementing power aware switching using data analytics in accordance with embodiments described herein.

FIG. 4 is a flow diagram illustrating steps that may be performed in implementing power aware switching using data analytics in accordance with embodiments described herein. Referring to FIG. 4, in step 400, for each outgoing interface, or port, of a network element, such as one of leaf nodes 102(1)-102(4), 202(1)-202(4), data comprising the number of packets coming in to the port and the amount of power being consumed by (or attributed to) the port during a current snapshot time interval is collected. In step 402, the collected data is used to calculate a P/W value for the current snapshot time interval. In step 404, a mean of the P/W values for the port calculated for the current time interval and one or more immediately preceding time intervals is calculated. It will be recognized that, although in FIG. 3, only P/W values for only 3 snapshot time intervals of 5 seconds each are used to calculate the mean, as a practical matter, the number of snapshots (x) used in calculating the mean and the length of the time intervals (y) between which the snapshots are taken may be automatically determined by the power saving module or manually selected by a user. For example, in an "auto mode" of operation, the power saving module may determine how to change the values of snapshots (x) and intervals (y) based on traffic patterns. For example, if the number of packets seen on outgoing ports is relatively constant, the power saving module will use the default values for x and y (e.g., x=3 and y=5 seconds). In contrast, if the number of packets seen on outgoing ports is varying, then the module will take more snapshots at smaller time intervals (e.g., x=10 and y=1 second).

In step 406, the mean calculated in step 402 is used to determine a variance and standard deviation of the P/W value for the port over the relevant time period (i.e., the current snapshot time interval and the number of immediately preceding snapshot time intervals used in calculating the mean in step 402). In step 408, the variance may be associated with the port and/or the link associated with the port for use by a link state protocol, such as OSPF or IS-IS, as the cost metric associated with the port/link and is used by the link state protocol to select an outgoing port on which to send traffic. Execution proceeds to step 410 to await expiration of the next snapshot time interval, at which point execution returns to step 400. In cases in which all three of the ports Eth1/1, Eth2/1, Eth3/1 have a constant incoming packet rate, the variance for all of the ports will be zero. In this case, the link state protocol will select the outgoing port of the line card that consumes the least amount of power.

Figure 5:
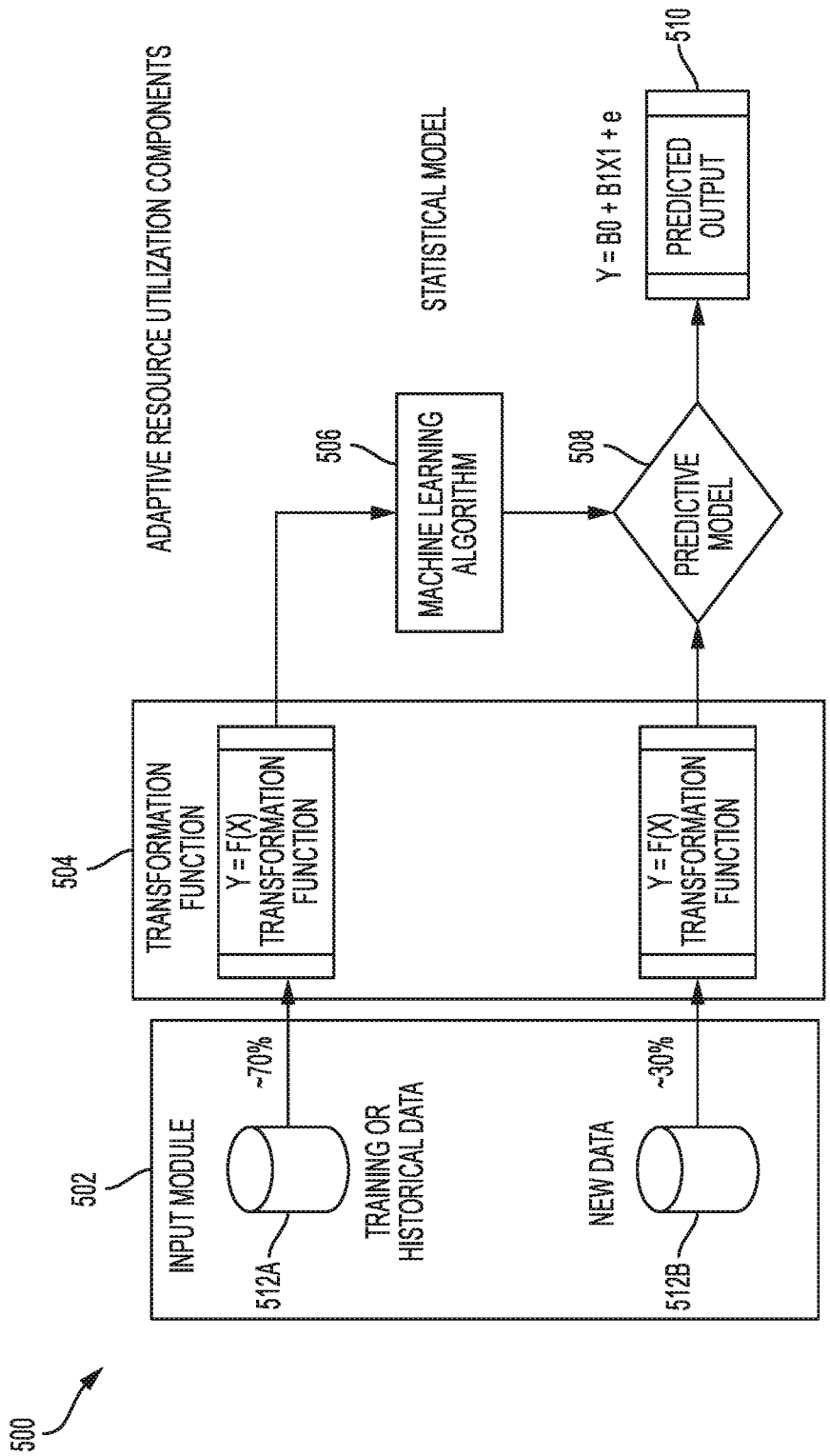
FIG. 5 is a simplified block diagram of a machine learning service that may be used in implementation of power aware switching using data analytics in accordance with embodiments described herein.

Referring now to FIG. 5, in accordance with features of embodiments described herein, and as mentioned above, power aware switching using data analytics in accordance with embodiments described herein may be implemented using a machine learning service 500. As illustrated in FIG. 5, the machine learning service 500 may include an input module 502, a transformation, or vector, function 504, a machine learning algorithm 506, a predictive model 508, and a predicted output module 510. The input module 502 may be implemented using one or more databases in which are stored two types of data: training (or historical) data 512A and new data 512B. Training data 512A is data that has been previously accumulated from the system in connection with which analytics are being applied and stored in the input module 502. New data 512B is data that is input directly from the system in connection with which analytics are being applied. In accordance with features of certain embodiments, training data 512A generally constitutes approximately 70% of the total data comprising the input module 502, with the remaining 30% of the total data comprising the input module constituting new data 512B. It will be recognized that once the new data 512B is processed, it becomes training data. The training data 512A from input module 502 is normalized by the transformation function 504 and the normalized training data is used to train the machine learning algorithm 506, which may be implemented as a statistical model. The transformation function is used to normalize the historical dataset and new test dataset. The data is normalized using vector functions. The output of the machine learning algorithm 506 and the normalized new data from the transformation function 504 are input to a predictive model 508 to generate predicted output 510 using one or more of a variety of predictive techniques. For example, using linear regression, the power consumed by each line card can be predicted based on collecting the statistics of the packet. This can help the user in capacity planning or and can enable the user to add/delete ports based on results of the predictive analysis.

Figure 6:
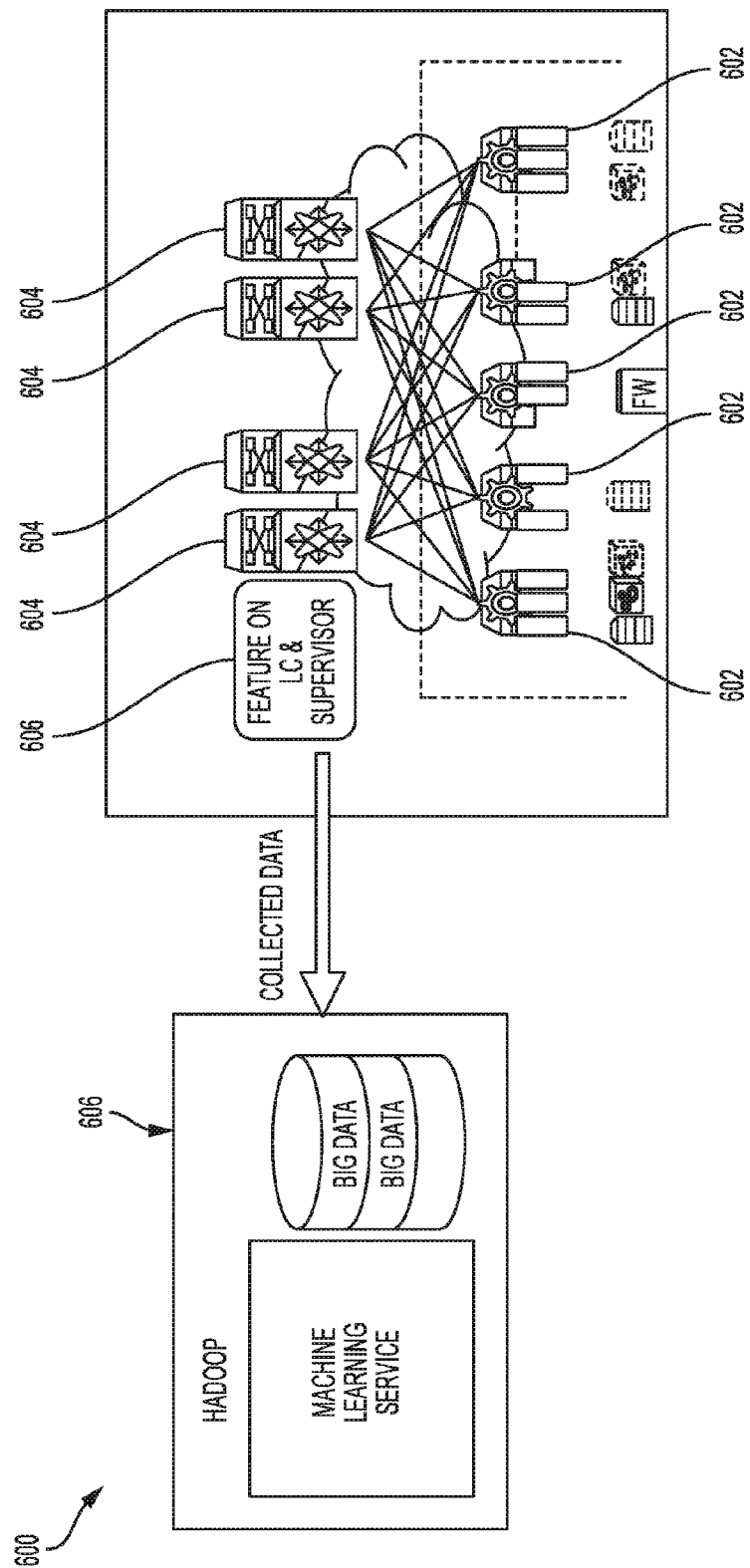
FIG. 6 is a more detailed block diagram of communications network in which embodiments described herein for power aware switching using data analytics may be implemented.

Referring now to FIG. 6, illustrated therein is a more detailed block diagram of communications network 600 in which embodiments described herein for power aware switching using data analytics may be implemented. As shown in FIG. 6, a network 600 comprises a fully meshed network topology of a number of leaf nodes 602 and a number of spine nodes 604. In accordance with features of embodiments described herein, power saving modules, collectively represented in FIG. 6 by a power saving module 606, may be implemented either on a line card or a supervisor of each of the leaf nodes 602 in the network 600 to collect real time power usage and package statistics and provide them to a machine learning service implemented in a distributed storage and processing system, such as a Hadoop engine, 208 designed for storing and processing big data. Power saving module 606 may also provide collected statistical data to a data center network manager ("DCNM"), which may use the data for predictive analysis at the data center level.

It will be recognized that the various network elements shown in the drawings may be implemented using one or more computer devices comprising software embodied in one or more tangible media for facilitating the activities described herein. The computer devices for implementing the elements may also include a memory device (or memory element) for storing information to be used in achieving the functions as outlined herein. Additionally, the computer devices may include one or more processors capable of executing software or an algorithm to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, various functions outlined herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

Figure 7:
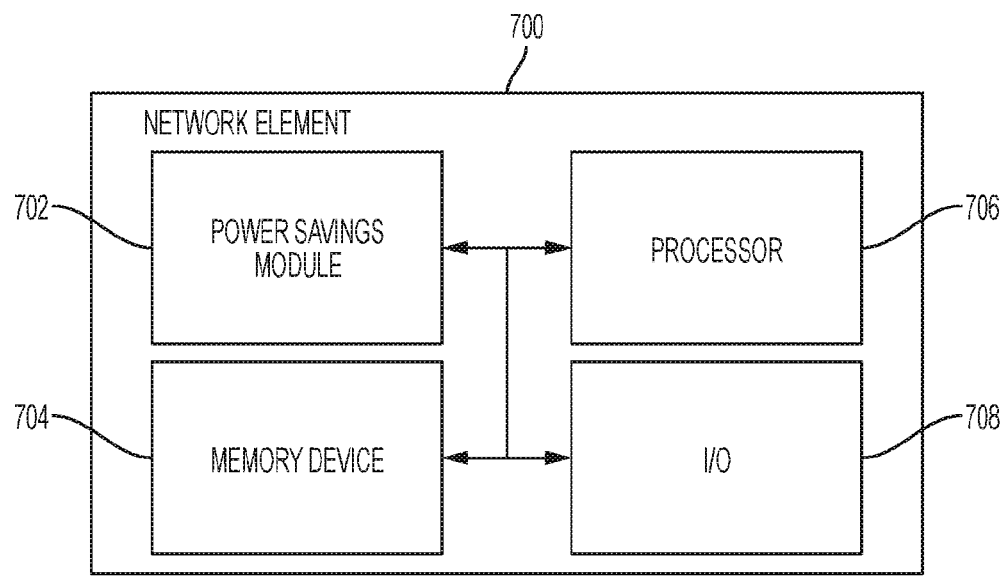
FIG. 7 is a simplified block diagram of a network element in which embodiments described herein for power aware switching using data analytics may be implemented.

Referring to FIG. 7, illustrated therein is network element 700, which in certain embodiment may be a leaf node such as shown and described in the preceding FIGURES. In accordance with features of embodiments described herein, the network element 700 includes a power savings module 702, which may include software embodied in one or more tangible media for facilitating the activities described herein. In particular, the module 702 may include software for facilitating the processes illustrated in and described with reference to FIG. 5. The network element 700 may also include a memory device 704 for storing information to be used in achieving the functions as outlined herein. Additionally, the network element 700 may include a processor 706 that is capable of executing software or an algorithm (such as embodied in module 702) to perform the functions as discussed in this Specification. The network element 700 may also include various I/O 708 necessary for performing functions described herein.

It will be recognized that the network element 700 shown in FIG. 7, as well as other network devices shown and described herein, may be implemented using one or more computer devices comprising software embodied in one or more tangible media for facilitating the activities described herein. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIG. 5 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 7-9. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 8:
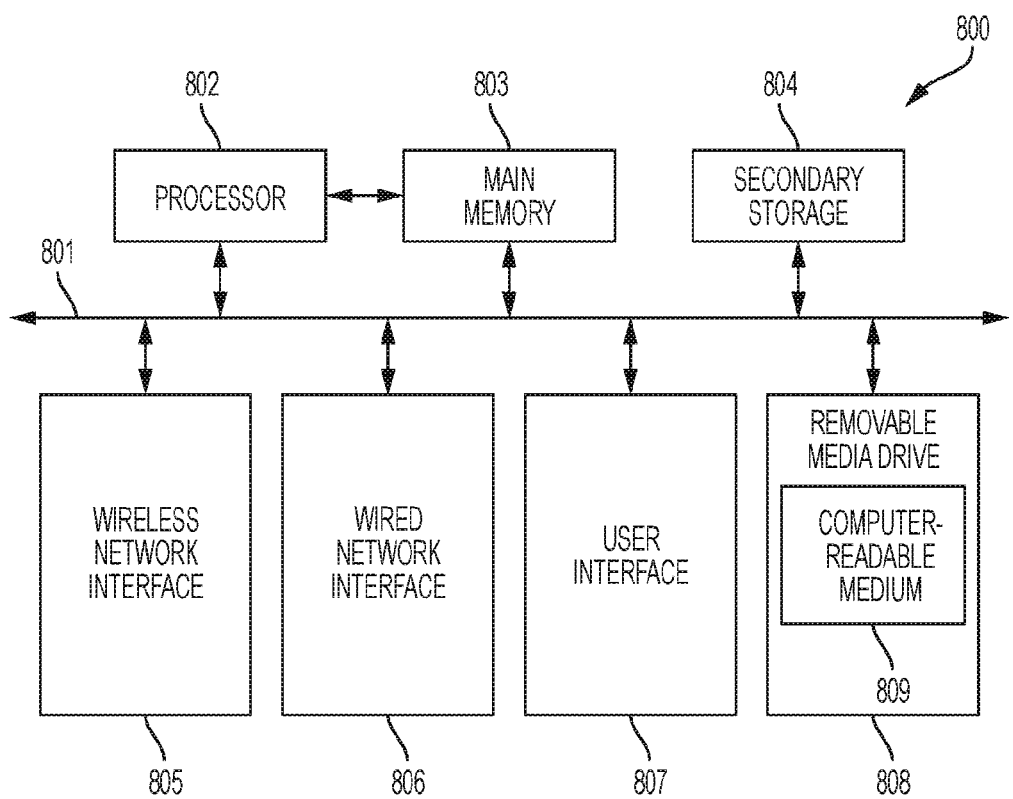
FIG. 8 illustrates a machine comprising an element of the various networks described herein in which embodiments described herein for power aware switching using data analytics may be implemented.

Turning to FIG. 8, illustrated therein is a simplified block diagram of an example machine (or apparatus) 800 that may be implemented as an element of a system for use in implementing a technique for enabling dynamic update of network device data models in accordance with embodiments described herein. The example machine 800 corresponds to network elements and computing devices that may be deployed in any one of the networks illustrated and described herein, such as networks 100 and 200, including spine and leaf nodes. In particular, FIG. 8 illustrates a block diagram representation of an example form of a machine within which software and hardware cause machine 800 to perform any one or more of the activities or operations discussed herein. As shown in FIG. 8, machine 800 may include a processor 802, a main memory 803, secondary storage 804, a wireless network interface 805, a wired network interface 806, a user interface 807, and a removable media drive 808 including a computer-readable medium 809. A bus 801, such as a system bus and a memory bus, may provide electronic communication between processor 802 and the memory, drives, interfaces, and other components of machine 800.

Processor 802, which may also be referred to as a central processing unit ("CPU"), can include any general or special-purpose processor capable of executing machine readable instructions and performing operations on data as instructed by the machine readable instructions. Main memory 803 may be directly accessible to processor 802 for accessing machine instructions and may be in the form of random access memory ("RAM") or any type of dynamic storage (e.g., dynamic random access memory ("DRAM")). Secondary storage 804 can be any non-volatile memory such as a hard disk, which is capable of storing electronic data including executable software files. Externally stored electronic data may be provided to computer 800 through one or more removable media drives 808, which may be configured to receive any type of external media such as compact discs ("CDs"), digital video discs ("DVDs"), flash drives, external hard drives, etc.

Wireless and wired network interfaces 805 and 806 can be provided to enable electronic communication between machine 800 and other machines via networks (e.g., control plane 108, data plane 110. In one example, wireless network interface 805 could include a wireless network controller ("WNIC") with suitable transmitting and receiving components, such as transceivers, for wirelessly communicating within a network. Wired network interface 806 can enable machine 800 to physically connect to a network by a wire line such as an Ethernet cable. Both wireless and wired network interfaces 805 and 806 may be configured to facilitate communications using suitable communication protocols such as, for example, Internet Protocol Suite ("TCP/IP"). Machine 800 is shown with both wireless and wired network interfaces 805 and 806 for illustrative purposes only. While one or more wireless and hardwire interfaces may be provided in machine 800, or externally connected to machine 800, only one connection option is needed to enable connection of machine 800 to a network.

A user interface 807 may be provided in some machines to allow a user to interact with the machine 800. User interface 807 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 808 represents a drive configured to receive any type of external computer-readable media (e.g., computer-readable medium 809). Instructions embodying the activities or functions described herein may be stored on one or more external computer-readable media. Additionally, such instructions may also, or alternatively, reside at least partially within a memory element (e.g., in main memory 803 or cache memory of processor 802) of machine 800 during execution, or within a non-volatile memory element (e.g., secondary storage 804) of machine 800. Accordingly, other memory elements of machine 800 also constitute computer-readable media. Thus, "computer-readable medium" is meant to include any medium that is capable of storing instructions for execution by machine 800 that cause the machine to perform any one or more of the activities disclosed herein.

Not shown in FIG. 8 is additional hardware that may be suitably coupled to processor 802 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 800 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 800 to appropriately manage the operation of the hardware components therein.

The elements, shown and/or described with reference to machine 800, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities related to the system described herein (e.g., the steps shown in FIG. 5) may be implemented in software in, for example, leaf nodes. In some embodiments, this software could be received or downloaded from a web server, provided on computer-readable media, or configured by a manufacturer of a particular element in order to provide this system for implementing autonomic LISP for enabling a secure hybrid cloud extension in accordance with features of embodiments described herein. In some embodiments, one or more of these features may be implemented in hardware, provided external to these elements, or consolidated in any appropriate manner to achieve the intended functionality.

In one example implementation, leaf and spine nodes are network devices or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 803, secondary storage 804, computer-readable medium 809) can store data used for the operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 802) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of networks illustrated herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system as shown in the FIGURES and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   for each of a plurality of outgoing ports of a first network element:
   collecting data comprising a number of packets arriving at the outgoing port to be sent from the first network element and an amount of power consumed by the outgoing port for a first time interval;
   calculating a packet per watt ("P/W") metric for the outgoing port for the first time interval, wherein the P/W metric comprises the number of packets arriving at the outgoing port divided by the amount of power consumed by the outgoing port during the first time interval;
   repeating the collecting and calculating for the outgoing port over a number of successive time intervals;
   calculating a mean P/W metric for the outgoing port over a time period comprising the first time interval and the successive time intervals;
   calculating a variance for the outgoing port over the time period comprising the first time interval and the successive time intervals;
   comparing variances associated with each outgoing port of the plurality of outgoing ports to determine an outgoing port having the lowest variance; and
   redirecting traffic received at the network element to the outgoing port having the lowest variance.

2. The method of claim 1, wherein the redirecting comprises assigning the calculated variance to a link associated with the outgoing port as a cost metric of the link for use by a link state protocol.

3. The method of claim 2, wherein the link state protocol comprises one of Open Shortest Path First ("OSPF") and Intermediate System to Intermediate System ("ISIS").

4. The method of claim 1, further comprising, for each of the outgoing ports, calculating a standard deviation for the time period comprising the first time interval and the successive time intervals.

5. The method of claim 1, further comprising storing the collected data for each of the outgoing ports in a central database associated with the first network element.

6. The method of claim 5, further comprising:
   processing newly collected data against the stored data using a machine learning algorithm; and
   initiating a network power-saving action based on the processing.

7. The method of claim 6, wherein the power-saving action comprises one of: displaying per-port power savings for each of the outgoing ports; powering down one of the outgoing ports and moving traffic to another one of the outgoing ports; powering down a portion of the first network element; powering down a line card of the first network element on which at least one of the outgoing ports is disposed; and powering down the first network element in its entirety.

8. The method of claim 1, wherein the first network element comprises a leaf switch in a fully meshed spine-leaf network.

9. One or more non-transitory tangible media that includes code for execution and when executed by a processor is operable to perform operations comprising:
   for each of a plurality of outgoing ports of a first network element:
   collecting data comprising a number of packets arriving at the outgoing port to be sent from the first network element and an amount of power consumed by the outgoing port for a first time interval;
   calculating a packet per watt ("P/W") metric for the outgoing port for the first time interval, wherein the P/W metric comprises the number of packets arriving at the outgoing port divided by the amount of power consumed by the outgoing port during the first time interval;
   repeating the collecting and calculating for the outgoing port over a number of successive time intervals;
   calculating a mean P/W metric for the outgoing port over a time period comprising the first time interval and the successive time intervals;
   calculating a variance for the outgoing port over the time period comprising the first time interval and the successive time intervals;
   comparing variances associated with each outgoing port of the plurality of outgoing ports to determine an outgoing port having the lowest variance; and
   redirecting traffic received at the network element to the outgoing port having the lowest variance.

10. The media of claim 9, wherein the redirecting comprises assigning the calculated variance to a link associated with the outgoing port as a cost metric of the link for use by a link state protocol.

11. The media of claim 10, wherein the link state protocol comprises one of Open Shortest Path First ("OSPF") and Intermediate System to Intermediate System ("ISIS").

12. The media of claim 9, wherein the operations further comprise:
storing the collected data for each of the outgoing ports in a central database associated with the first network element;
processing newly collected data against the stored data using a machine learning algorithm; and
initiating a network power-saving action based on the processing.

13. The media of claim 12, wherein the power-saving action comprises one of: displaying per-port power savings for each of the outgoing ports; powering down one of the outgoing ports and moving traffic to another one of the outgoing ports; powering down a portion of the first network element; powering down a line card of the first network element on which at least one of the outgoing ports is disposed; and powering down the first network element in its entirety.

14. The media of claim 9, wherein the first network element comprises a leaf switch in a fully meshed spine-leaf network.

15. An apparatus comprising:
a memory element configured to store data;
a processor operable to execute instructions associated with the data; and
a power savings module configured to:
for each of a plurality of outgoing ports of a first network element:
collect data comprising a number of packets arriving at the outgoing port to be sent from the first network element and an amount of power consumed by the outgoing port for a first time interval;
calculate a packet per watt ("P/W") metric for the outgoing port for the first time interval, wherein the P/W metric comprises the number of packets arriving at the outgoing port divided by the amount of power consumed by the outgoing port during the first time interval;
repeat the collecting and calculating for the outgoing port over a number of successive time intervals;
calculate a mean P/W metric for the outgoing port over a time period comprising the first time interval and the successive time intervals;
calculate a variance for the outgoing port over the time period comprising the first time interval and the successive time intervals;
compare variances associated with each outgoing port of the plurality of outgoing ports to determine an outgoing port having the lowest variance; and
redirect traffic received at the network element to the outgoing port having the lowest variance.

16. The apparatus of claim 15, wherein the redirecting comprises assigning the calculated variance to a link associated with the outgoing port as a cost metric of the link for use by a link state protocol.

17. The apparatus of claim 16, wherein the link state protocol comprises one of Open Shortest Path First ("OSPF") and Intermediate System to Intermediate System ("ISIS").

18. The apparatus of claim 15, wherein the apparatus is further configured to:
store the collected data for each of the outgoing ports in a central database associated with the first network element;
process newly collected data against the stored data using a machine learning algorithm; and
initiate a network power-saving action based on the processing.

19. The apparatus of claim 18, wherein the power-saving action comprises one of: displaying per-port power savings for each of the outgoing ports; powering down one of the outgoing ports and moving traffic to another one of the outgoing ports; powering down a portion of the first network element; powering down a line card of the first network element on which at least one of the outgoing ports is disposed; and powering down the first network element in its entirety.

20. The apparatus of claim 15, wherein the first network element comprises a leaf switch in a fully meshed spine-leaf network.

* * * * *